United States Patent [19]
Haenni et al.

[11] 4,299,149
[45] Nov. 10, 1981

[54] APPARATUS FOR REMOVING AND STACKING OF SHEET METAL STRIPS CUT BY A PLATE SHEAR

[75] Inventors: Eduard A. Haenni, Zofingen; Christian Ragletti, Gockhausen, both of Switzerland

[73] Assignee: Haemmerle AG, Zofingen, Switzerland

[21] Appl. No.: 76,180

[22] Filed: Sep. 17, 1979

[30] Foreign Application Priority Data

Sep. 19, 1978 [DE] Fed. Rep. of Germany ....... 2840668

[51] Int. Cl.³ .............................................. B26D 7/06
[52] U.S. Cl. ......................................... 83/91; 83/110; 83/157; 83/86; 83/94
[58] Field of Search ................................. 83/157, 110

[56] References Cited

U.S. PATENT DOCUMENTS

| | | | |
|---|---|---|---|
| 3,260,145 | 7/1966 | Giordano | 83/157 X |
| 3,974,726 | 8/1976 | Stursberg | 83/157 |
| 4,014,230 | 3/1977 | Eisele | 83/157 |
| 4,036,087 | 7/1977 | Braun | 83/110 |

Primary Examiner—Donald R. Schran
Attorney, Agent, or Firm—Abraham A. Saffitz

[57] ABSTRACT

An Apparatus arranged behind the blades of a plate shear used for cutting sheet metal strips from a sheet metal plate to remove these strips from a sheet metal plate to remove these strips from the place behind the blades of the plate shear and to stack these strips on piles at a predetermined position behind the plate shear.

8 Claims, 1 Drawing Figure

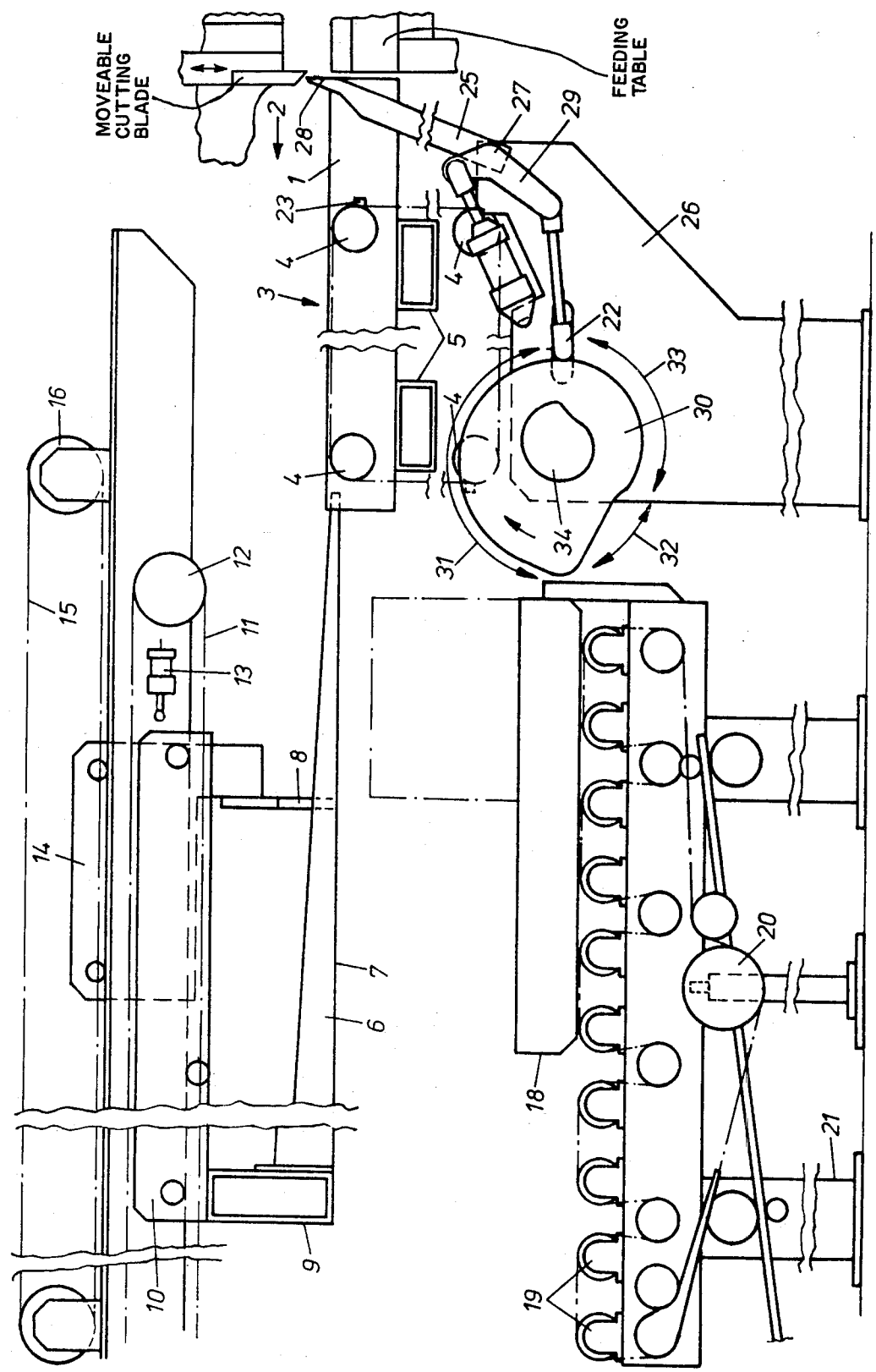

APPARATUS FOR REMOVING AND STACKING OF SHEET METAL STRIPS CUT BY A PLATE SHEAR

BACKGROUND OF THE INVENTION

1. Field of the Invention

The present invention refers to sheet metal cutting apparatus, and more particularly to an apparatus arranged behind the blades of a plate shear used for cutting sheet metal strips from a sheet metal plate to remove these strips from the place behind the blades of the plate shear and to stack these strips on piles at a predetermined position behind the plate shear.

2. Description of the Prior Art

Already known in the art is a plate shear to cut sheet metal plates with very sensitive surfaces. This plate shear comprises a feeding table to feed the sheet metal plate to be cut to a pair of blades of the shear, the lower stationary blade being connected to the one edge of this feeding table, extending cross to the direction of feeding. This apparatus is further equipped with a stop member arranged in a certain distance from said stationary blade, against which an edge of the sheet metal plate abuts to determine strips ob sheet metal to be cut by the cooperation of the lower, stationary blade with an upper, movable blade.

The strips are supported, before and during the cutting operation, by a supporting member, which is displaceable from an operating position in the level of said feeding table between said stationary blade and said stop member to a retracted position away from said stationary blade and behind said stop member. The supporting member may consist of a plurality of supporting rods, arranged parallel to each other. As soon as the strip of sheet metal is cut, the supporting member is suddenly retracted and the strip will fall down onto a pile.

With this apparatus, the position of the pile is exactly and invariably determined to be directly behind the stationary blade. All strips, independently of their size, fall on the same pile. Therefore, such a pile comprising strips of different size, must be sorted, which is a very time consuming and sometimes dangerous job, rendering the final product more expensive.

OBJECT OF THE INVENTION

It is an object of the present invention to provide an improved apparatus without these drawbacks, which makes it possible to stack strips of different sizes to different piles, whereby the cut strips are removed from the place behind the stationary blade and displaced to a suitable position to form a number of piles each comprising only strips of identical size. If only strips of identical size are cut, the available space can be better used by forming a plurality of piles one beneath the other one. A further aspect is, that the removing of the strips from the region behind the stationary blade must be done very quickly as modern plate shears are able to operate with a high sequence.

SUMMARY OF THE INVENTION

This object is accomplished with an apparatus for cutting strips of sheet metal from a plate which comprises a sheet metal feeding table, a lower stationary blade along one edge of said feeding table, a upper movable blade to cooperate with said lower stationary blade, a stop member arranged behind said stationary blade in a certain distance therefrom and a supporting member in the height level of said feeding table and being displaceable from a first, working position between said stationary blade and said stop member to a second, retracted position away from said stationary blade behind said stop member.

According to the invention, the supporting member extends above a plurality of pile positions one behind the other one in the direction of feeding of the sheet metal. The supporting member is displaceable along all these pile positions in a fully retracted clearing position, and the stop member is also displaceable synchronously with said supporting member, but may be stopped selectively above one of the pile positions, while the supporting member is further displaced to its fully retracted position.

BRIEF DESCRIPTION OF THE DRAWING

One embodiment of the apparatus will now be described in greater detail with reference to the accompanying drawing, which shows a schematical side view.

DESCRIPTION OF THE PREFERRED EMBODIMENT

Referring now to the drawing, there is provided a working surface adjacent the feeding table with a supporting grid 1 for receiving a strip of sheet metal, which has been cut by means of a plate shear designated by the legend cutting movable blade in the drawing. The strip of sheet metal is delivered to the supporting grid 1 in the direction of arrow 2. Beneath the supporting grid 1, there is provided a chain conveyor 3, which is guided by means of four driving rollers 4 which are supported in an independent frame 5. Behind the chain conveyor 3, in the same level, there is provided a supporting rake 6, whose supporting surface 7 is limited by a stop member 8 which extends at a right angle to the feeding direction and is adjustable in the feeding direction of the chain conveyor 3.

The supporting rake 6 is connected to a transverse support member 9, which in turn is fastened to a sliding carrier 10. The sliding carriage 10 is displaceable back and forth by means of an endless chain drive 11, guided by rollers 12. The back and forth movement of the sliding carriage 10 is limited by end stop members 13. For simplicitys sake, there are shown only one roller 12 and only one end stop member 13, while it is understood that there a plurality thereof is used in practise.

The stop member 8, which also has the form of a rake and extends between the individual bars of the supporting rake 6, as shown by dotted lines, is suspended on a second sliding carriage 14, which is displaceable back and forth along the supporting rake 6 by means of a chain drive 15. The chain drive 15 is guided by rollers 16, only one thereof being shown in the drawing.

Below the supporting rake 6, if it is in it's frontal end position, there is provided a pallet 18 to receive several piles of sheet metal strips. The pallet 18 is supported by a roller conveyor which comprises a plurality of rollers 19 driven by a common motor 20. All rollers 19 are mounted on a frame 21, where means are provided to adjust the rollers in their height. While sheet metal strips are delivered to the piles, the rollers 19 and thereby the pallet 18 is lowered, so that the top surfaces of the piles is always approximately on the same height level. As soon as a pallet is fully loaded, the rollers 19 are lowered in their lowest position, the pallet 18 removed and a fresh, emphy pallet placed onto the rollers 19.

Below the supporting grid 1, there are provided a plurality of pushing arms 25, which are received in a housing 26 and are pivotably supported by an axle 27. Each upper free end 28 of the arms 25 (the drawing shows but one single arm) extends between the parallel bars of the supporting grid 1 a little above the supporting level.

The pivotal movement of the arms 25 is effected by means of a knee lever 29, which is connected to a cam follower 22. The cam follower 22 is pressed against the circumferential surface of a cam disc 30, which is driven by a motor (not shown) in a clockwise sense of rotation.

The section 31 of the cam disc 30 has the effect of an accelerating movement of the arms 25 to the left. Then, a section 32 follows for retraction of the arms 25, while a third section 33 causes no pivoting of arm 25. Further, there is provided a second, coaxially arranged cam disc 34 which is driven by the same motor as the first cam disc 30 and which controls the speed of revolution of an oil motor (not shown) which drives the chain conveyor 3.

It may be of advantage if the assembly consisting of chain conveyor 3, frame 5 and arms 25 including driving means is adjustable in height. Before the strip of sheet metal is cut, the said assembly is in its upper position and is lowered, together with the blade of the plate shear, to its lowermost position. Once the cut is finished, the assembly will be lifted to its upper position.

In operation, a sheet metal piece is positioned relative to the blade of the plate shear and a predetermined strip of sheet metal is cut. This cut metal strip will be received by the supporting grid 1 and its backward edge lies in the region of the pushing arms 25. Under influence of the section 31 of the cam disc 30 the arms are driven to an accelerating pivotal movement to the left and the sheet metal strip will be delivered to the chain conveyor 3. The chain conveyor 3 is equipped with driving pins 23 which are accelerated to the same speed as the arms 25, so that the lagging edge of the metal strip is pushed further on by the pins 23 with a constant speed, as soon as the strip has left the region of influence of the arms 25.

Now, the metal strip reaches the supporting rake 6 which at first is at rest and is accelerated to the speed of the metal strip shortly before the lagging edge thereof leaves the chain conveyor 3. This is accomplished by means of a suitable control of the driving means of the sliding carriage 10, whereby the start command is given by an initiator or a feeler influenced directly by the strip of sheet metal. The supporting rake 6 is displaced towards the stop member 8. However, before the leading edge of the sheet metal strip touches the stop member 8, which is positioned in front of the final, desired position, the stop member 8 is accelerated, by displacing the sliding carriage 14, to reach the same speed as the metal strip on the supporting rake 6. As soon as the leading edge of the metal strip touches the stop member 8, the latter will be decelerated until it stops at the desired, final position, thereby stopping the sheet metal strip very gently.

The rake 6 however is further displaced with the same speed as before until it is completely retracted from the region of the piles. The sheet metal strip will then fall onto the pallet 18 on one of the piles, dependant of the position of the stop member 8.

If necessary, a plurality of pallets 18 may be provided, one beneath the other one in a direction parallel to the cutting blade of the plate shear. In this way, short metal strips can be delivered to the pallets one after the other one. The fully loaded pallets are then removed by driving the rollers 19. In order to keep the distance of fall of the metal strips constant, the whole assembly of rollers 19 is adjustable in height. If the pallets 18 are empty, they are in their uppermost position, and as soon as the piles grow, they are lowered to keep the distance between supporting rake 6 and upper surface of the piles approximately constant.

In place of the pallets 18, it is possible to use containers, which are like wise received on the rollers 19.

A simplified embodiment can be provided as follows: The supporting rake 6 as well as the stop member 8 are provided directly behind the blades of the plate shear. The pushing arms 25 and their associated driving means are omitted. The supporting rake 6 as well as the stop member 8 including their driving means are connected directly to the upper blade support of the plate shear.

The speed of the cut sheet metal strip directly behind the blades is zero. Then, the metal strip is transported by the supporting rake 6 with increasing speed in the direction of arrow 2. Initially, the stop member will have the same speed of displacement as the supporting rake 6, but is driven by separate driving means. As soon as the desired pile is reached, the stop member 8 and thereby also the metal strip is stopped, while the supporting rake 6 is further displaced with undiminished speed to its end position. The metal strip will be kept by the stop member 8 and falls on the pile, as soon as the supporting rake 6 is completely retracted.

This embodiment is especially suitable in connection with plate shears, where the sheet metal plates to be cut are fed to the shear by hand.

However, with all embodiments, the sheet metal is handled very gently and carefully so that no scratching of the surface of the metal can occur. Any rough pushing or hit on the sheet metal strips is avoided which could lead to a damage of the edges of the strips.

What we claim is:
1. An apparatus for cutting strips from a sheet metal plate removing the cut strips from the cutting blades and stacking the strips on a plurality of piles comprising:
   cutting blades comprising a stationary blade and a moveable blade;
   a feeding table for supporting the metal plate which is cut into strips by said cutting blades;
   said stationary blade being arranged along an edge of said feeding table and said moveable blade cooperating with said stationary blade to cut strips adjacent said edge;
   a supporting member located behind said stationary blade and arranged at the same height as said feeding table;
   displacing means cooperating with said supporting member to displace said supporting member from a first working position behind said stationary blade, above and next to the plurality of piles of cut strips of sheet metal to a second position which clears said plurality of piles and is away from said plurality of piles of cut strips;
   conveying means between said stationary blade and said supporting member for moving the cut strips to the plurality of piles;
   pushing means to accelerate said cut strips said conveying means; and a stop member selectively displaceable from a first position for a predetermined distance behind said stationary blade to a second retracted position being above one of the plurality of piles of sheet metal strips.

2. An apparatus as claimed in claim 1 wherein said conveyer means comprises a chain conveyer with one set of driving pins and said pushing means comprises pushing arms for accelerating the cut strips to the velocity of the driving pins of said chain conveyer.

3. An apparatus as claimed in claim 2 wherein said displacing means comprises a first sliding carraige and an endless chain driving means to move said supporting means between a first position and a second position at said stop members and a second sliding carraige is provided for said stop member whereby the said supporting means is displaced from a forward position into a position behind the stop members.

4. An apparatus as claimed in claim 3 wherein said endless chain driving means is provided with a sensing feeler to contact the cut metal strip in front of on said supporting means whereby the operation of said chain driving means is controled by said sensing feeler.

5. An apparatus as claimed in claim 2 wherein said pushing arms are provided with a cam disc, said cam disc having a portion for accelerating the forward movement of said pushing arms, another portion for retracting the pushing arms and a further portion which constitutes a neutral portion which permits no movement of said pushing arms.

6. An apparatus as claimed in claim 5 including a hydraulic motor for driving said chain conveyer and further including a second cam disc to control the speed of said hydraulic motor.

7. An apparatus as claimed in claim 6 including vertically displacement means for moving said chain driving means up and down in synchronous movement with the cutting action of said moveable and stationary blade whereby said vertical displacement means moves downwardly with the cutting movement of said blades.

8. An apparatus as claimed in claim 7 including a roller conveyer below said supporting member for receiving pallets of cut strips or containes holding cut strips from a pile of the metal strips to remove said strips along a vertical direction.

* * * * *